(No Model.) 4 Sheets—Sheet 1
J. RUPPERT.
PACKING, COOLING, AND DISPENSING DEVICE FOR BEER.
No. 581,085. Patented Apr. 20, 1897.
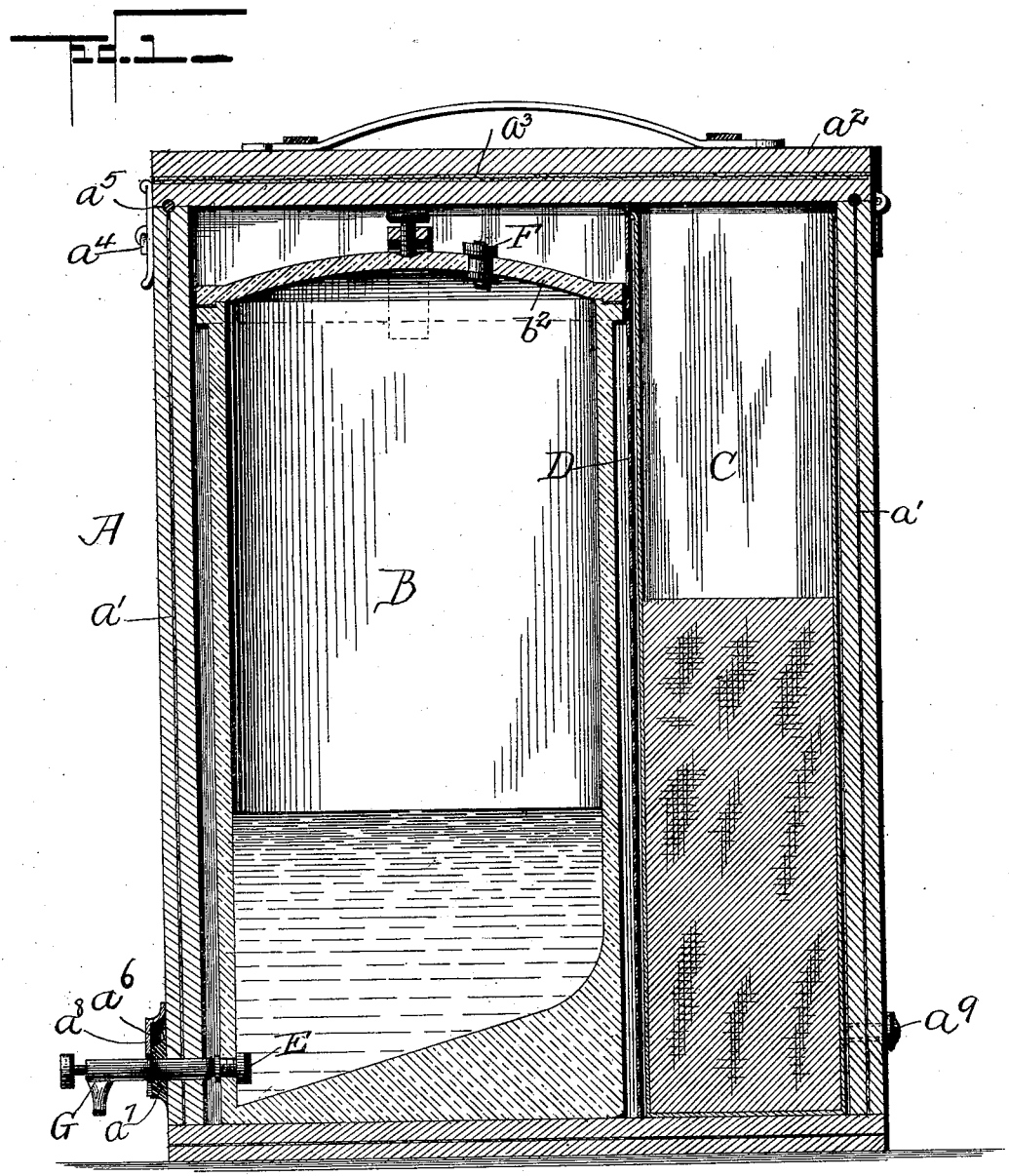
WITNESSES:
Richard Lips
Horace T. Deitz
INVENTOR
Jacob Ruppert,
BY
Adam Echat
ATTORNEY
THE NORRIS PETERS CO., PHOTO-LITHO., WASHINGTON, D. C.

(No Model.) 4 Sheets—Sheet 2.
J. RUPPERT.
PACKING, COOLING, AND DISPENSING DEVICE FOR BEER.
No. 581,085. Patented Apr. 20, 1897.
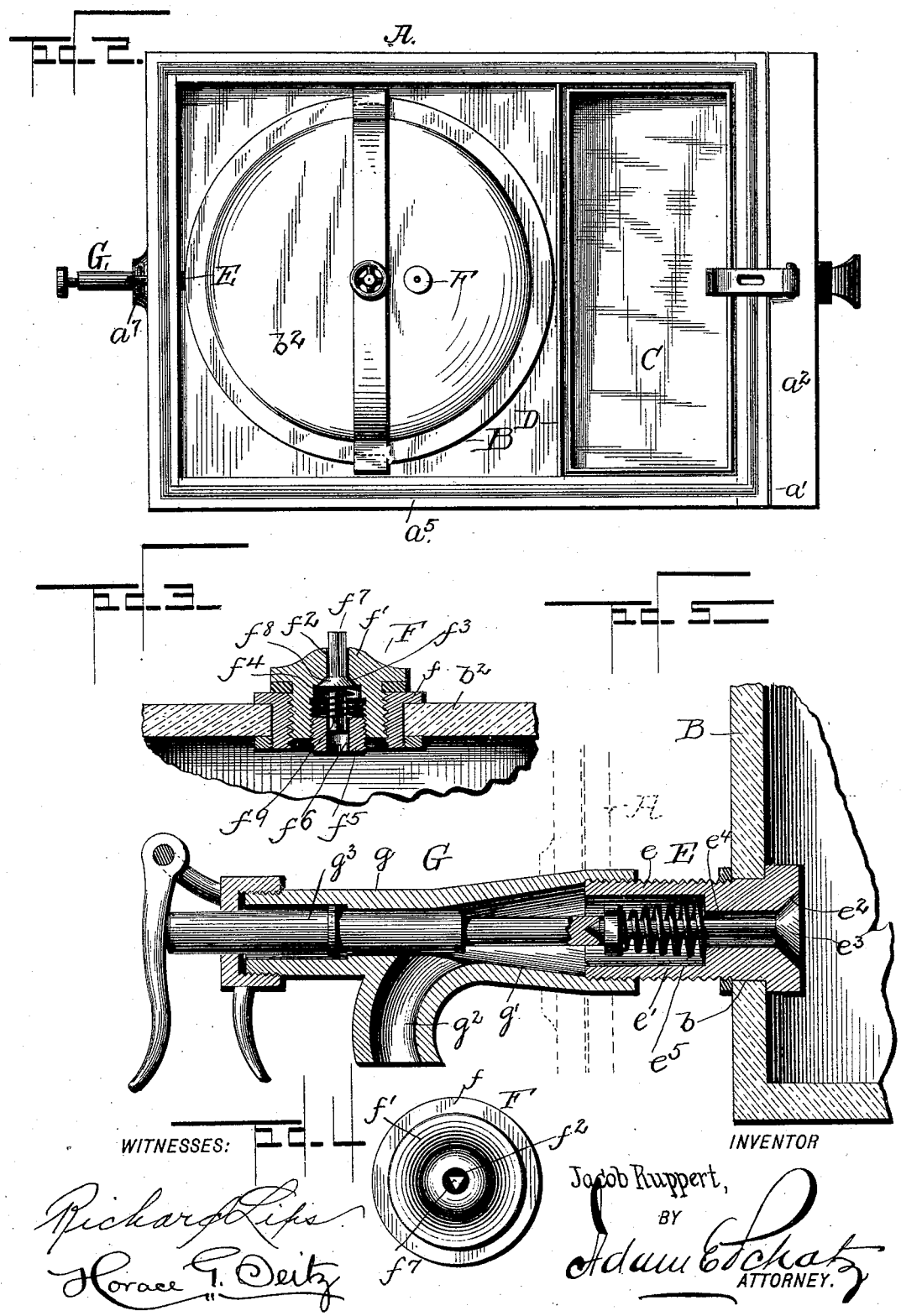

(No Model.) 4 Sheets—Sheet 3.
J. RUPPERT.
PACKING, COOLING, AND DISPENSING DEVICE FOR BEER.
No. 581,085. Patented Apr. 20, 1897.
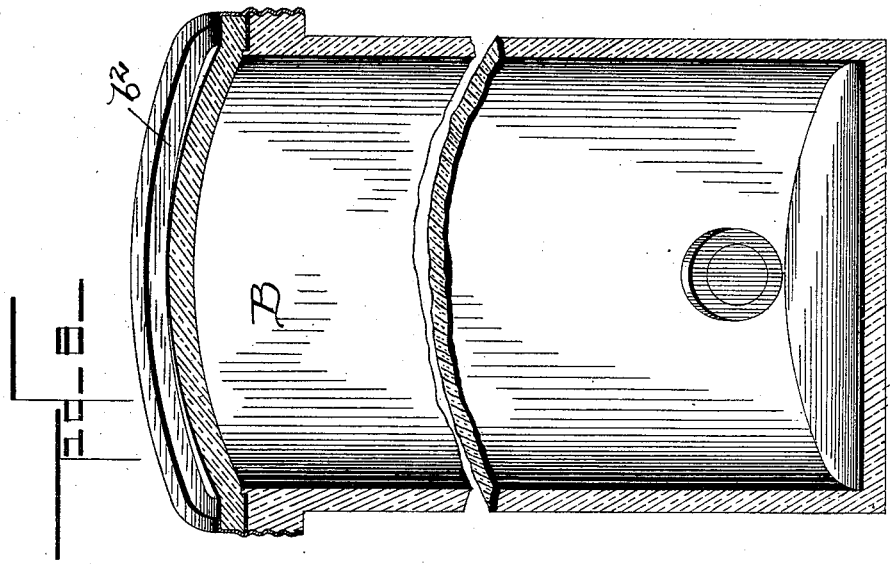
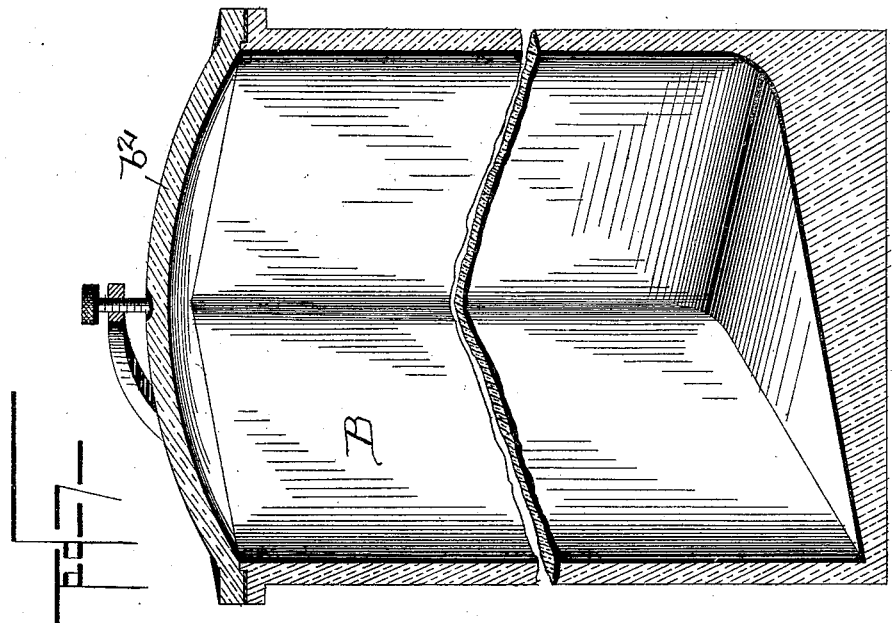
WITNESSES: INVENTOR
Jacob Ruppert,
BY
ATTORNEY.

(No Model.)　　　　　　　　　　　　　4 Sheets—Sheet 4.
J. RUPPERT.
PACKING, COOLING, AND DISPENSING DEVICE FOR BEER.
No. 581,085.　　　　　　　Patented Apr. 20, 1897.
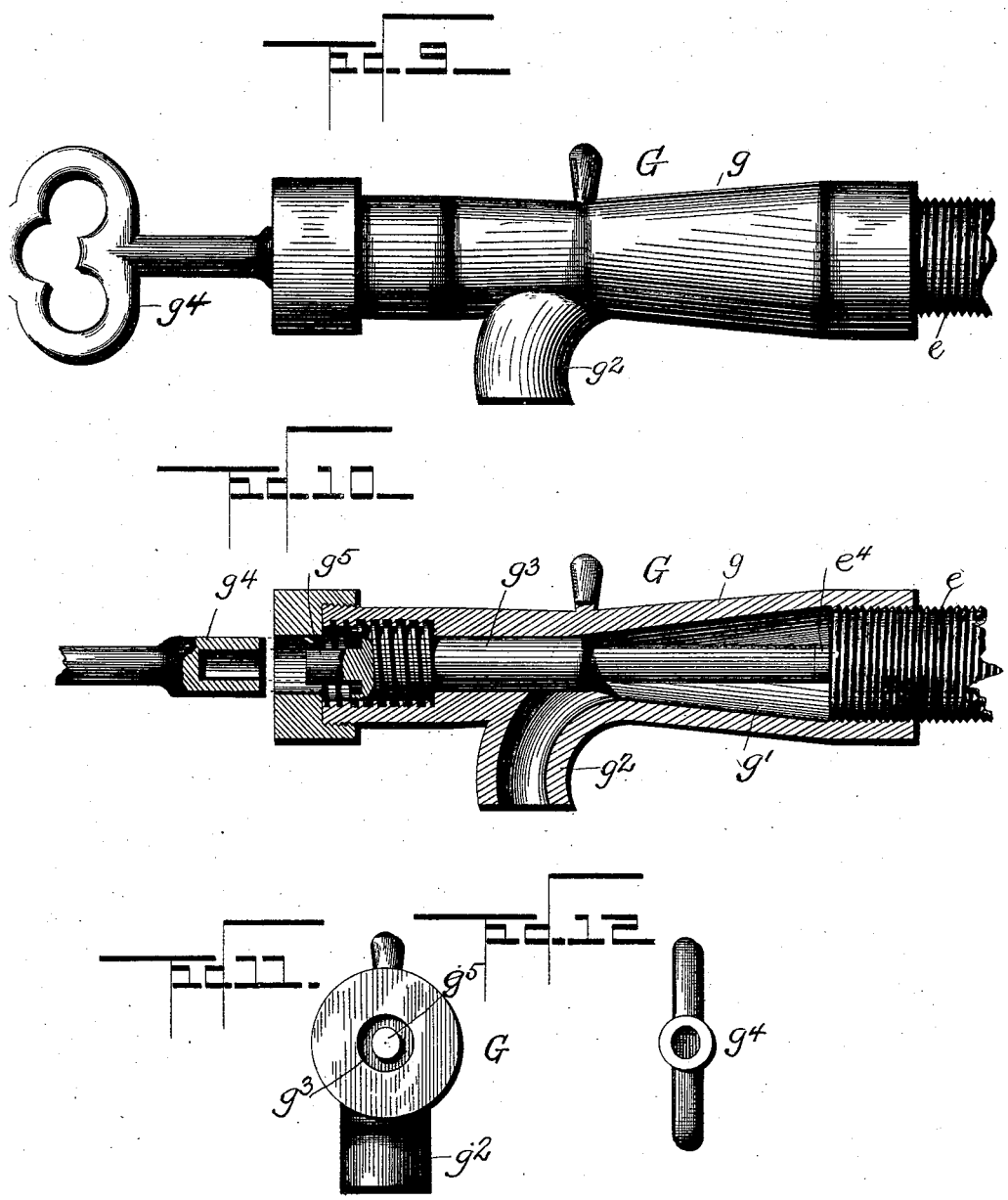
WITNESSES:
INVENTOR
Jacob Ruppert,
BY
ATTORNEY.

UNITED STATES PATENT OFFICE.

JACOB RUPPERT, OF NEW YORK, N. Y.

PACKING, COOLING, AND DISPENSING DEVICE FOR BEER.

SPECIFICATION forming part of Letters Patent No. 581,085, dated April 20, 1897.

Application filed March 16, 1896. Serial No. 583,314. (No model.)

*To all whom it may concern:*

Be it known that I, JACOB RUPPERT, a citizen of the United States, and a resident of New York city, county and State of New York, have invented a new and useful Improvement in Packaging, Cooling, and Dispensing Beer, of which the following is a specification.

My invention relates to improvements in beer-packages, and has particular relation to that class of such devices in which the beer contained in the package will be kept at a cool and even temperature and which while the package is locked will allow the beer to be drawn from the receptacle and dispensed.

The objects of my invention are to provide a beer-package which is portable, in which the beer is kept at an even temperature, in which the beer will not foam while being drawn, and which when delivered is sealed, but which after the seal is broken will allow the beer to be drawn from the receptacle; also, to provide a beer-package of a size sufficient to contain a large quantity of beer in one receptacle, the use of bottles being eliminated, and which will allow of a portion of the contents to be drawn without having the remainder deteriorated in its palatable flavor and effervescence, and also to provide a package which can be readily cleansed.

My invention consists in the improved construction and combination of parts, as more fully described, and particularly pointed out in the claims.

In the drawings, in which similar letters of reference indicate similar parts in all of the views, Figure 1 is a vertical longitudinal sectional view of a beer-package embodying the elements forming my invention. Fig. 2 is a plan view of the same in which the lid is shown as raised. Fig. 3 is a sectional view showing the construction of the air-inlet vent. Fig. 4 is a top plan view of the same. Fig. 5 is a sectional view of the beer-tapping mechanism. Fig. 6 is a detail perspective view of the protector in its position when sealing the package, and Figs. 7 and 8 are detail sectional views showing modified forms of the jars. Figs. 9, 10, 11, and 12 are views showing a modified form of the beer-tap.

Heretofore it has been the practice in making beer-coolers for use in saloons, &c., to fill a jar with beer under pressure or to connect the cooler with a keg or barrel of beer which forces the contents through the cooler and causes, when the beer is tapped, foaming, which has been found to be undesirable. It being a well-known fact that the beer-cooler is an advantage over the selling of beer in bottles, it is essential, therefore, that the above disadvantages be obviated as much as possible. To tap beer from bottles, unless the entire contents are immediately used, causes the flavor of the beer to be deteriorated, which is also the case when the bottled beer is laid on ice before using, the extreme cold serving to give an unnatural chill to the bottle and beer. Again, it is extremely hard to thoroughly cleanse bottles after they have been emptied, it being almost invariably found that some particles remain and thus cause the beer to sour or ferment. This has also been found to be the case in almost all of the beer-coolers. It is to prevent these disadvantages, together with many that have not been mentioned, among which might be stated the fact of servants taking and using bottled beer unknown to the owner, that the present invention has been formulated, in which a beer-package will be found to be neat and attractive in its appearance, simple in its operation, and durable in construction.

Referring now to my invention, A designates a receptacle having in each of its sides and bottom suitable insulating material $a'$, such as felt, tarred paper, sawdust, charcoal, &c. Hinged to the top of the rear side of the receptacle is the lid or cover $a^2$, having suitable insulating material $a^3$, and which is adapted to fit and close said receptacle. A handle may be secured to the top of the lid or cover to enable the package to be more readily transported or carried about. A lock $a^4$ is adapted to lock the lid securely to the receptacle in order that the contents may not be removed from the receptacle by an unauthorized person. Although an ordinary form of lock is shown, it is to be noted that any lock may be used, and, if it be desired, the same may be concealed by having the lock fit into a suitable catch in the inside of the receptacle, but which can be opened by any one having a key to fit the lock. To more fully prevent the inlet of warm air, &c., to the package, a ring $a^5$, preferably formed of rubber, is secured in a recess formed in the lid and the sides of the package.

At the front of the receptacle, near its bottom, is formed an opening $a^6$ for a purpose which will be hereinafter described. On the outer side of the receptacle, adapted to fit and partially close said opening $a^6$, is secured a disk $a^7$, of rubber or other suitable material. $a^8$ designates a protector-plate of a form adapted to fit over said disk $a^7$ and which normally closes said opening $a^6$, preventing the inlet of air or an instrument for tapping the beer. When the package is ready to be delivered, the protector $a^8$ is closed down over the disk $a^7$ and a seal of suitable form is secured thereto by suitable securing devices, thus preventing any tampering with the contents, the unbroken seal indicating that the contents are intact.

At a suitable point at the rear side of the receptacle, preferably near its bottom, is placed an air-vent $a^9$.

Located in the receptacle, preferably in its front portion and adapted to be removably secured therein, is a jar B, of suitable size and shape, adapted to contain the beer. The inner side of the bottom of the jar is preferably made as shown in Figs. 1 and 7, in order that all of the beer in the jar may be readily drawn out without compelling the tilting of the package. The jar is closed by means of a top $b^2$, which may be secured to the jar by any suitable means.

The jar B is provided at its front side, near its bottom and coincident with the opening $a^6$ in the receptacle, with an opening $b$, in which is secured by suitable means the spring-closed bung E, composed of the bushing $e$, having a central longitudinal opening $e'$ and a valve-seat $e^2$, in which are located the valve $e^3$ and valve-stem $e^4$, which valve is adapted to be normally held in position on its seat by the spring $e^5$. The end of the valve-stem $e^4$ is preferably cone-shaped in order that the beer-tap plunger may be more easily centered.

The jar-top $b^2$ is provided with a vent-bung F for the inlet of air when the beer is being drawn. The bung F is composed of a collar $f$, secured to the lid or cover $b^2$ by any suitable means, and into which a screw-threaded plug $f'$, having a central opening $f^2$, is secured. The opening $f^2$ is formed into a valve-seat $f^3$, which in turn opens into an enlarged opening $f^4$, the interior of the plug being screw-threaded for a portion of its length to receive a smaller plug $f^5$, having a central opening $f^6$ to correspond with the opening $f^2$. The valve-plunger $f^7$, having the valve $f^8$, is adapted to be placed in said openings $f^2 f^6$ and is normally held in position against the valve-seat $f^3$ by means of a delicate spring $f^9$. This construction is such that ordinarily the valve will be held against the valve-seat, but upon a vacuum being formed in the jar by the drawing off of the beer the valve will be caused to move from its seat to allow of the inlet of a sufficient quantity of air to fill the vacuum caused by the withdrawing of the beer.

In the receptacle at the opposite side from the jar B is removably located the cooling-tank C, preferably of rectangular shape and having an open top and formed of suitable material, preferably tin. The tank is adapted to contain ice either in crushed or solid form, the latter being preferable, inasmuch as the tanks may be filled with water and then frozen into a solid mass in any of the freezing apparatuses usually found in breweries and in ice-manufactories.

Between the jar and tank is removably secured a perforated plate D, of suitable material, for the purpose of preventing the jar from coming into direct contact with the cooling-tank, obviating the unnatural chill of a direct contact, but which will allow the cold air to pass into the space formed around and about the jar. It is obvious that these elements inside the receptacle being all removable, the box or receptacle may at any time be used as a simple storage-tank, if so desired.

After the package has been filled by placing the jar, perforated plate, and cooling-tank in position, the lid locked into position, and the protector sealed, the package is ready to be delivered to its destination. The package having been delivered, together with the beer-tap G, composed of the plunger-casing $g$, having opening $g'$ and nozzle $g^2$, the plunger $g^3$, having its front end adapted to fit the conical end of the valve-stem $e^4$ and having at its rear end suitable attachments for readily manipulating the plunger, one form of which is shown in Fig. 5, to draw the beer the seal is first broken, the protector raised, leaving the opening $a^6$ free, the tap G is inserted, turned onto the bung E, and the plunger $g^3$ actuated, in turn operating the valve $e^3$, and the beer will flow out through the nozzle $g^2$, cool air from the outside of the jar being admitted to take the place of the beer drawn off through the air-vent F.

It is obvious that as long as any beer remains in the jar it will be kept cool and at an even temperature and there will be no opportunity for the beer to become stale, the admission of the cold air through the air-vent bung F tending to preserve the temperature of the beer, while the air drawn in through the air-vent $a^9$, which is practically of the same construction as the bung F, will pass entirely around the cooling-tank before it comes into contact with the jar, the air becoming cooled before it passes through the perforated plate.

The advantages of this construction have been given and it is not thought necessary to reiterate them, but it is believed that by the above construction a beer-package will be formed which will deliver the beer, as long as any remains in the jar, with the same flavor, cool, and without foam, and which can be readily transported. The jars will be constructed to hold one or two gallons, thereby making them useful in serving beer for household purposes.

In Figs. 9, 10, 11, and 12 a modified form of a beer-tap is shown. In this form the plunger $g^3$ has its rear portion screw-threaded, which when the key $g^4$ is placed over the oval-shaped end $g^5$ of the plunger and turned to the right causes the plunger to press forward against the valve-stem $e^4$, causing the valve $e^3$ to be moved off of its seat $e^2$. By the use of this form the taking of the beer by any person not having the key (such as servants) is prevented.

Having thus described my invention, what I claim as new is—

1. A portable beer-package comprising a sealed insulated receptacle provided with a valved opening, a dispensing-jar removably located therein, said jar having a vent and bung, and means for drawing liquid therefrom; a removable imperforated cooling-tank, located in said receptacle between said jar and said opening whereby the incoming air is cooled before passing into said jar.

2. In a portable beer-dispensing apparatus, the combination with an insulated receptacle having an insulated hinged cover adapted to be locked to said receptacle; of a jar removably located in said receptacle, said jar having a top removably secured thereto at its upper edges, said top having a spring-closed air-vent; a spring-closed bung secured to said jar near its bottom; a cooling-tank located in said receptacle; a perforated plate removably located in said receptacle between the jar and the cooling-tank; and a beer-tap removably connected to said spring-closed bung, whereby the liquid may be drawn from said jar, substantially as described.

3. In a beer cooling and dispensing package, the combination with an insulated hermetically-sealed package having a compartment for the beer and a compartment for the cooling-tank and having also an opening for the passage of a beer-tap; a removable cooling-tank located in said package; and an air-vent located in the side of said package; of a jar removably located in said package, having a spring-closed bushing or bung; a lid or cover removably secured to said jar, said lid having a spring-actuated air-inlet vent; and a beer-tap, adapted to pass through the opening in said package and be turned on said bung, substantially as described.

4. A portable beer-package, comprising an insulated receptacle having a sealed insulated cover; a dispensing-jar removably located therein and having a vent and bung; an independently-removable cooling-tank located in said receptacle contiguous to said dispensing-jar; a removable perforated plate between said jar and said cooling-tank; and a beer-tap adapted to be passed through a suitable opening in said receptacle and be turned on said bung for drawing the beer from said jar.

5. A portable beer-package comprising a sealed insulated receptacle; a dispensing-jar removably located therein, said jar having a vent and bung; a removable cooling-tank located in said receptacle independent of and contiguous to said jar; means for drawing liquid from said jar; and a valved opening for automatically admitting air to said receptacle as the liquid is being drawn from said jar.

6. In a beer-package, the combination of a receptacle; a removable dispensing-jar; a removable cooling-tank; and a removable perforated plate between said jar and said tank.

In testimony that I claim the foregoing as my invention I have signed my name, in presence of two witnesses, this 4th day of March, 1896.

JACOB RUPPERT.

Witnesses:
 HERMANN A. SCHALK,
 JOHN G. GILLIG.